United States Patent [19]

Terpstra et al.

[11] Patent Number: 5,707,584
[45] Date of Patent: Jan. 13, 1998

[54] METHOD FOR THE PRODUCTION OF CERAMIC HOLLOW FIBRES

[75] Inventors: Rinse Alle Terpstra, Geldrop; Joost Petrus Gerardus Maria Van Eijk, Berkel-Enschot; Frits Kornelis Feenstra, Delft, all of Netherlands

[73] Assignee: Nederlandse Organisatie Voor Toegepast-Natuurwetenschappelijk Onderzoek Tno, Delft, Netherlands

[21] Appl. No.: 532,651
[22] PCT Filed: Mar. 30, 1994
[86] PCT No.: PCT/NL94/00069
 § 371 Date: Nov. 29, 1995
 § 102(e) Date: Nov. 29, 1995
[87] PCT Pub. No.: WO94/23829
 PCT Pub. Date: Oct. 27, 1994

[30] Foreign Application Priority Data

Apr. 15, 1993 [NL] Netherlands ............... 9300642

[51] Int. Cl.$^6$ .................................................. C04B 38/00
[52] U.S. Cl. ............... 264/628; 264/634; 264/117.11; 264/DIG. 19
[58] Field of Search ............... 264/63, DIG. 19, 264/634, 628, 177.11

[56] References Cited

U.S. PATENT DOCUMENTS

| | | | |
|---|---|---|---|
| 4,222,977 | 9/1980 | Dobo | 264/DIG. 19 |
| 4,571,414 | 2/1986 | Renlund | 524/322 |
| 5,135,895 | 8/1992 | Frechette | 264/DIG. 19 |

FOREIGN PATENT DOCUMENTS

| | | |
|---|---|---|
| 0 047 640 | 3/1982 | European Pat. Off. |
| 2 466 269 | 4/1981 | France. |
| 29 19 510 | 11/1979 | Germany. |
| 2 022 565 | 12/1979 | United Kingdom. |

*Primary Examiner*—James Derrington
*Attorney, Agent, or Firm*—Young & Thompson

[57] ABSTRACT

In order to produce ceramic hollow fibers, in particular hollow fiber membranes for microfiltration, ultrafiltration and gas separation, a paste is made filling a polymer binder system with a ceramic powder. The paste is processed by extruding through a spinneret to give hollow fibers. The binder system is removed with the aid of thermal diffusion and the powder particles are sintered to each other.

6 Claims, 1 Drawing Sheet

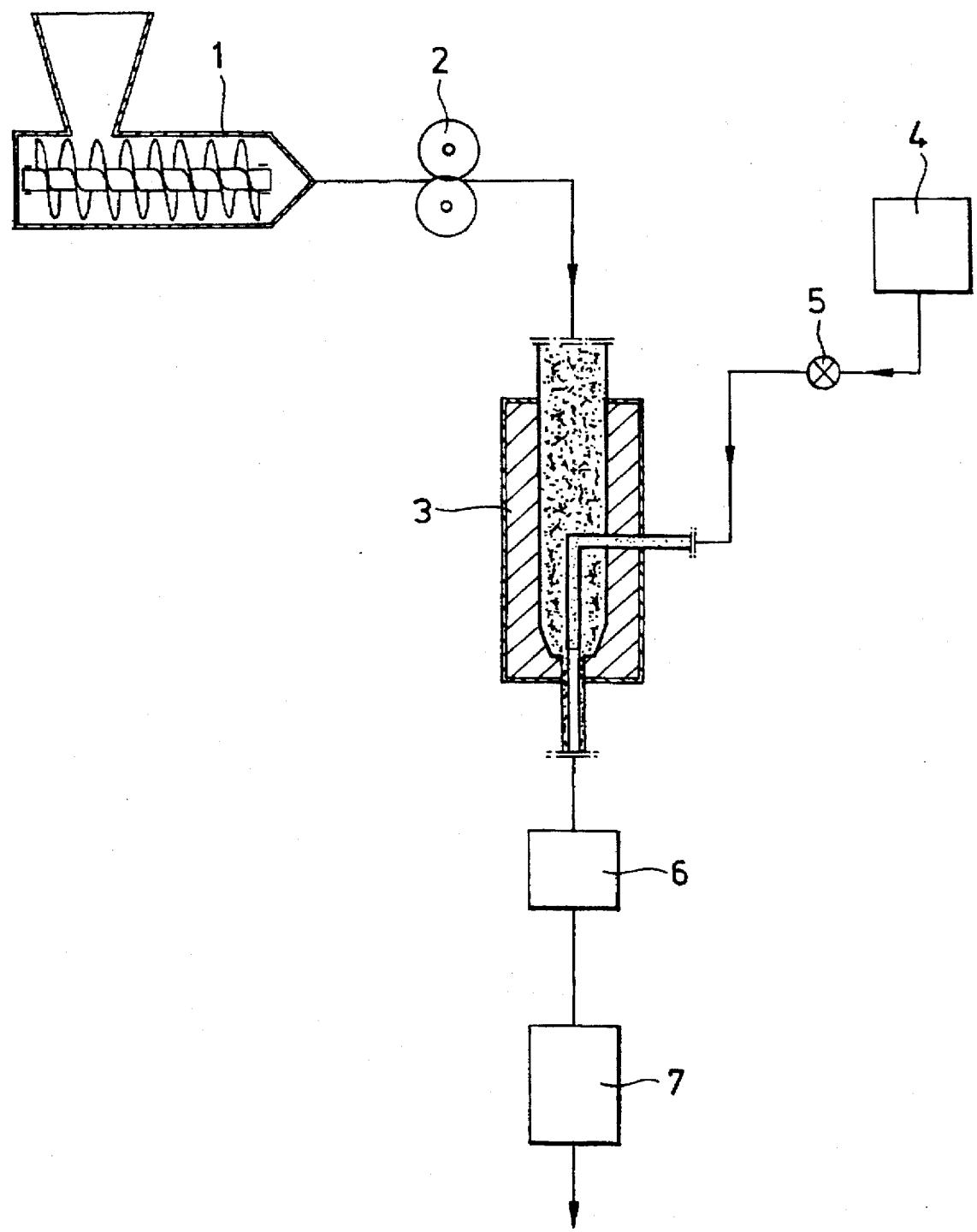

METHOD FOR THE PRODUCTION OF CERAMIC HOLLOW FIBRES

FIELD OF THE INVENTION

The invention relates to a method for the production of ceramic hollow fibre membranes for microfiltration, ultrafiltration and gas separation, said filter membranes having an external diameter of 0.5–3 mm and a wall thickness of 30–500 μm.

BACKGROUND OF THE INVENTION

Separation processes are of great economic importance for the concentration and separation of gases and liquids. Membrane technology is being used to an ever increasing extent in this field. The use of hollow fibre membranes in a separation or concentration process has a number of concomitant advantages:

the surface area/volume ratio is relatively high; the efficiency of the concentration or separation process will be high; and the process is also easy to carry out and to adapt to the needs.

The abovementioned surface area/volume ratio is of vital importance to be able to compete with other types of membranes.

Hollow fibre membranes have already been available for years and are widely used. Commercially available hollow fibre membranes consist of a polymer material and consequently are sensitive to corrosive conditions and higher temperatures. In order to solve this problem attempts have been made to produce ceramic hollow fibre membranes, for example by condensing vapour on a carbon wire and then removing the wire. A sol-gel method for the production of ceramic thin membranes on a porous ceramic hollow fibre substrate has also been described in the "Journal of Membrane Science", 59 (1991), pp 81–99. However, these attempts have not led to a situation where ceramic fibres are commercially obtainable.

Dry and wet spinning are together with melt spinning the most commonly used spinning processes in the field of fibre production. Despite the fact that melt spinning is the most economical for fibre production (see Encyclopaedia of Polymer Science and Engineering, volume 6, John Wiley and sons, 1986, page 805) to the best of our knowledge this method was never used before to produce ceramic hollow fibre membranes.

SUMMARY OF THE INVENTION

The aim of the invention is to provide a method by means of which ceramic hollow membrane fibres for microfiltration, ultrafiltration and gas separation can be produced on an industrial scale.

According to the invention this method is characterised in that a paste is made by filling a thermoplastic polymer binder system with a ceramic powder, the said thermoplastic binder system is made plastic by heating and the paste is processed by melt extruding through a spinneret to give ceramic hollow fibre membranes, that the binder system is removed with the aid of thermal diffusion and that the powder particles are sintered to each other to obtain single layer hollow fibre membranes without an additional microporous layer.

For the ceramic powder, use is preferably made of silicon nitride ($Si_3N_4$), but aluminium oxide, silicon carbide and other substances can also be used.

The thermoplastic binder system will be filled with ceramic powder to 40 to 60% V/V.

It has been found that a thermoplastic binder system of the following composition leads to good results: 37% m/m polyethylene vinyl acetate, 23% m/m ethylenebisstearylamide, 15% m/m dioctyl phthalate, 11% m/m oleic acid, 12% m/m polyglycol ester and 2% m/m polyglycol ether.

Use of the method according to the invention can lead to fibre membranes having a surface area/volume ratio of at least 1000 $m^2/m^3$.

BRIEF DESCRIPTION OF THE DRAWING

The FIGURE is a schematic of an apparatus for practicing the present method.

DETAILED DESCRIPTION OF THE PREFERRED EMBODIMENT

FR-A-2466269 discloses a method for the production of ceramic support tubes. Several pastes are made by mixing a mineral of inorganic powder with a binder, for instance an organic binder. From each of the pastes a layer is made and the layers are simultaneously extruded or spun to form tubes. The obtained tubes are subject to a sintering operation. Finally a microporous layer is deposited on the tubes. There is no talk of a thermoplastic binder, there is no heating to make the binder plastic, the paste is not processed by melt extruding and the resulting membrane tubes consist of several layers.

FR-A-2502508 discloses a method for the production of ceramic tubular ultrafiltration membranes comprising:

making a support tube by extruding a paste consisting of a sinterable composition with relatively course grains and an organic binder, and depositing a thin layer on the support tube, the thin layer consisting of a sinterable composition with relatively fine grains and an organic binder, and subjecting the product to a temperature causing its sintering as well as the decomposition of the organic binder. The binder materials are not of a thermoplastic nature, no heating takes place to obtain melt extruding and the final product is not a single layer hollow fibre membrane. The area/volume ratio will have a relatively low value.

DE-A-2919510 discloses a method for the production of inorganic hollow fibres comprising:

making a solution of an organic fibre forming polymer having dispersed therein an inorganic material which can be sintered, dry or wet spinning the solution through a spinneret, forming a polymer hollow fibre loaded with the inorganic material, removing the polymer, and sintering the inorganic material to form inorganic hollow fibres having an external diameter of 0.5–3 mm and a wall thickness of 30–500 mm.

GB-A-12022565 describes the production of ceramic hollow fibre membranes having an outer diameter of 50–6000 μm and a wall thickness of 20–300 μm. The mixture from which the fibre membranes are made, may consist of an inorganic material uniformly dispersed in a polymer solution which comprise the fibre forming organic polymer dissolved in a suitable solvent. The concentration of the organic polymer in the solution is sufficient to form, when the solution contains the inorganic material, the precursor polymer hollow fibres by dry and/or wet spinning techniques. This specification does not disclose the melt extrusion of a paste made plastic by heating.

The invention will now be explained in more detail with the aid of the diagrammatic FIGURE. In the FIGURE, an extruder 1 can be seen, which introduces the paste to be spun into the spinneret 3 by means of a spinning pump 2. A gas tank 4 feeds gas via a reducing valve 5 into a line which terminates centrally in the spinneret and, by means of a gas jet, ensures that the hollow fibre produced is held open and cooled. The hollow fibre is subsequently subjected to heat after-treatment in a burn-off furnace 6 and a sintering installation 7.

The paste which is spun to give hollow fibre membranes consists of a thermoplastic polymer binder system and a ceramic powder. The thermoplastic polymer system becomes plastic at a temperature of between 50° and 220° C. and serves as an aid during shaping (and sintering). The percentage of ceramic powder is between 30 and 70% V/V, preferably between 45 and 55% V/V. The paste is mixed in a mixer and granulated after cooling. The granules are then introduced into the extruder 1, where they melt again and, via the spinning pump 2 and spinneret 3 are formed into hollow fibre membranes.

The polymer binder system is removed in the burn-off furnace 6, after which the residual shape is sintered in a sintering installation 7.

The thermoplastic binder in the paste can have the following composition.

| Component | Make | Type | % m/m |
|---|---|---|---|
| Polyethylene vinyl acetate | Esso | Escorene Ultra UL | 37 |
| Ethylenebisstearylamide | Hoechst | 02020 | 23 |
| Dioctyl phthalate | Hoechst | Wax C Micropowder PM | 15 |
| Oleic acid | Merck | | 11 |
| Polyglycol ester | Hoechst | | 12 |
| Polyglycol ether | Hoechst | Genagen C-100 Arkopal N-100 | 2 |

The ceramic powder in the paste preferably consists of silicon nitride ($Si_3N_4$), although aluminium oxide, silicon carbide, sialon and other ceramic powders can also be used. The gas which is blown into the interior of the spun fibre is, for example, nitrogen in the case of silicon nitride powder and, for example, oxygen or air in the case of aluminium oxide powder. The type of gas is not a crucial factor for processing.

In the case of material based on silicon nitride, a certain amount of sinter aid, for example itrium oxide or aluminium oxide, can be added to the paste to control the porosity.

The temperature in the burn-off furnace is about 500° C. and that in the sintering furnace is about 1300° C. in the case of aluminium oxide powder and about 1650° C. in the case of silicon nitride powder. Sintering takes about 2 hours.

The hollow fibre membranes obtained are able to withstand a corrosive environment and a relatively high temperature. The external diameter is preferably less than 2 mm. The minimum dimension for the external diameter is in the region of 500 µm. The wall thickness is between 30 and 500 µm. The surface area/volume ratio is greater than 1000 $m^2/m^3$. The porosity is 30 to 50%.

Silicon nitride in particular has a high strength and density and, moreover, a very high temperature resistance and corrosion resistance. The pore size can be adjusted between 0.1 and 0.5 µm and the density and the pore size can be controlled with the aid of the sinter aid and with the aid of the sintering temperature. Obviously, various modifications and additions are possible within the scope of the invention. The ceramic powder chosen can also be hydroxyapatite, a ceramic powder that is biocompatible and that is used in artificial ossicles or as bone-replacement material. The particle size distribution of the powder can be important. A broad distribution leads to a higher degree of filling. The absolute particle size is important for the binder system removal process. The smaller the particles, the smaller will be the pores of the product formed and the more difficult it will be to remove the binder system.

By adding relatively large amounts of sinter additives and/or by using a higher sintering temperature and longer sintering time, it should be possible to dense-sinter the hollow fibres produced by means of the invention.

We claim:

1. A method for producing ceramic hollow fiber membranes for microfiltration, ultrafiltration and gas separation, said filter membranes having an external diameter of 0.5–3 mm and a wall thickness of 30–500 µm, said method comprising:

making a paste by filling a thermoplastic polymer binder system with a ceramic powder;

making said thermoplastic binder system plastic by heating;

melt extruding the paste through a spinneret to produce ceramic hollow fiber membranes;

heating the membranes to remove the binder system by thermal diffusion; and sintering the powder particles to each other to obtain single layer hollow fiber membranes being free of an additional micro-porous layer, said fiber membranes having a porosity of at least 30%.

2. Method according to claim 1, characterised in that the ceramic powder consists of silicon nitride ($Si_3N_4$).

3. Method according to claim 1, characterised in that the ceramic powder consists of aluminium oxide ($Al_2O_3$).

4. Method according to claim 1, characterised in that the binder system is filled with ceramic powder to 40 to 60% V/V.

5. Method according to claim 1, characterised in that the binder system has the following composition: 37% m/m polyethylene vinyl acetate, 23% m/m ethylenebisstearylamide, 15% m/m dioctyl phthalate, 11% m/m oleic acid, 12% m/m polyglycol ester and 2% m/m polyglycol ether.

6. Method according to claim 1, characterised in that the fibre surface area/volume ratio is at least 1000 $m^2/m^3$.

* * * * *